(12) United States Patent
Krieg et al.

(10) Patent No.: US 12,339,517 B2
(45) Date of Patent: Jun. 24, 2025

(54) OPTICAL SYSTEM AND METHOD FOR OPERATING AN OPTICAL SYSTEM

(71) Applicant: Carl Zeiss Meditec AG, Jena (DE)

(72) Inventors: Natalie Krieg, Aalen (DE); Andre Mueller, Koenigsbronn (DE)

(73) Assignee: Carl Zeiss Meditec AG, Jena (DE)

( * ) Notice: Subject to any disclaimer, the term of this patent is extended or adjusted under 35 U.S.C. 154(b) by 555 days.

(21) Appl. No.: 17/739,119

(22) Filed: May 7, 2022

(65) Prior Publication Data

US 2022/0357550 A1  Nov. 10, 2022

(30) Foreign Application Priority Data

May 7, 2021 (EP) ..................... 21172759

(51) Int. Cl.
*G02B 7/02* (2021.01)
(52) U.S. Cl.
CPC ............. *G02B 7/026* (2013.01); *G02B 7/021* (2013.01); *G02B 7/023* (2013.01)
(58) Field of Classification Search
CPC ........ G02B 7/026; G02B 7/021; G02B 7/023; G02B 7/04; G02B 7/003; G02B 7/005; G02B 21/26; G02B 21/0016; G02B 21/245
See application file for complete search history.

(56) References Cited

U.S. PATENT DOCUMENTS 5,748,393 A    5/1998  Edwards
6,118,242 A    9/2000  Shikano et al.
6,854,193 B2   2/2005  Lotze
2016/0373626 A1* 12/2016 Stetson .................. H04N 23/45

FOREIGN PATENT DOCUMENTS

| DE | 19711372 A1 | 10/1997 |
| DE | 102008040218 A1 | 1/2009 |
| EP | 1322909 B1 | 11/2010 |
| WO | 2019123965 A1 | 6/2019 |

OTHER PUBLICATIONS

Office Action issued in European Patent Application No. EP 21 172 759.9, dated Oct. 29, 2021 (from which this application claims priority) and English language translation thereof.

* cited by examiner

*Primary Examiner* — Angela M. Medich
(74) *Attorney, Agent, or Firm* — Ewers IP PLLC; Falk Ewers (57) ABSTRACT

The disclosure relates to an optical system and to a method for operating an optical system, wherein the optical system includes at least one carrier having at least one optical element, a movement bearing element for supporting the carrier during a movement, at least one first bearing element and at least one further bearing element for statically supporting the carrier, wherein the carrier includes corresponding bearing elements for providing static support, wherein the optical system includes a first and a further end stop element, wherein the carrier is supported movably between the end stop elements, wherein the first end stop element has or forms the first bearing element for providing static support and the further end stop element has or forms the further bearing element for providing static support, wherein the bearing elements define the stop poses of the carrier with repetition accuracy.

14 Claims, 8 Drawing Sheets

OPTICAL SYSTEM AND METHOD FOR OPERATING AN OPTICAL SYSTEM

CROSS REFERENCE TO RELATED APPLICATIONS

This application claims priority to German patent application EP 21 172 759.9, filed May 7, 2021, the entire content of which is incorporated herein by reference.

TECHNICAL FIELD

The disclosure relates to an optical system and to a method for operating an optical system.

BACKGROUND

In addition to an image sensor, image capture devices generally include an optical system including for example one or more lens element(s). For example, parameters such as a focal length, but also capture angles of a capture region (opening angle) can be defined by way of the properties of the optical elements. In order to change such parameters, it is possible that a property or a pose of an optical element is changed. It is known, for example, to change the pose of a lens element in relation to the image sensor so as to change the location of a focal point but also the capture angle stated above. In particular, a desired capture angle can be set by way of a targeted change of the pose of at least one optical element. The highly accurate setting of the pose of the optical element, however, requires highly precise manufactured components, a high degree of installation and adjustment complexity, and operation with minimum wear, which is likewise complex and costly.

DE 10 2008 040 218 A1 describes a method for operating an optical device having a rotatable optical element, in particular a microlithographic projection exposure apparatus. Said document describes bearing means for a rotatable optical element, in particular a three-point bearing.

The bearing elements described in DE 10 2008 040 218 A1 are used for static support before and after a rotation.

EP 1 322 909 B1 is furthermore known. The latter describes a coordinate measuring machine having a receptacle for automatically interchangeably attaching a sensor system and a three-point bearing.

Specific applications do not require a highly precise setting of parameters of an optical system to a multiplicity of values. It may thus be sufficient, for example, to set only a minimum and a maximum capture angle with a desired repetition accuracy, wherein the setting of further angles is not necessary with the same repetition accuracy. This is possible in particular, although not only, when setting capture angles of an image capture device for optically determining a pose, in particular for what is known as monoscopic pose capture. Such an image capture device is used for producing images of a marker or target, wherein a spatial pose, that is to say a position and/or orientation, of the target can be determined based on images, in particular based on a single image. Depending on the distance of the target from the image capture device, it may be desirable to set different capture angles to produce images with a sufficiently high resolution.

SUMMARY

This thus poses the technical problem of providing an optical system and a method for operating the optical system which enable simple and repetition-accurate setting of at least two, in particular exactly two, capture angles and possibly further parameters of the optical system.

The solution to the technical problem is provided by an optical system and a method for operating an optical system as described herein.

Provided is an optical system, in particular an optical system of an image capture device. The optical system includes at least one optical element, in particular at least one lens element. Rays can be guided onto an image sensor of the image capture device using the optical system. A capture angle of a capture region is defined by way of properties of the elements of the optical system, wherein the capture region designates a spatial region in which objects can be imaged by the image sensor. The optical system can be configured, as will be explained in more detail below, in particular such that the capture angle is variable. Alternatively or cumulatively to the capture angle, a further parameter of the optical system, for example a focal length, can also be defined by way of the optical system. This parameter can also be variable.

The optical system includes at least one carrier having at least one optical element, in particular at least one lens element. The carrier typically includes what is known as a cemented member, which may include at least two optical lens elements. Such a cemented member can be configured for example as a meniscus lens or as a convex-concave lens. The optical element can be attached to the carrier, in particular in a spatially fixed manner in relation to the carrier. It is also conceivable that the carrier forms the optical element.

The optical system further includes a movement bearing element for supporting the carrier during a movement. The carrier is thus movably supported. The movement bearing element can enable support via a fluid bearing, for example an air or gas bearing, a magnetic bearing, support of the carrier provided by rolling bearings, ball bearings, plain bearings, or flexures. The movement bearing element is typically an element for plain bearing. The movement bearing element can be formed, for example, by a housing or housing section of the optical system. In this case, wall surfaces of the housing can form bearing surfaces, in particular for the aforementioned plain bearing, wherein a movement space for the carrier is at least partially enclosed by the wall surfaces. Bearing surfaces of the housing can be planar or convex, in particular curved toward the carrier. The carrier can also form bearing surfaces or bearing sections, for example side periphery surfaces of a cuboid carrier. These, too, can be planar or convex, in particular curved toward the movement bearing element. The movement bearing element can in particular enable floating support of the carrier during the movement. Convex bearing surfaces advantageously reduce the size of the surfaces rubbing against one another.

The optical system can also include or form a guiding element for guiding the movement. This can be formed by the movement bearing element or a part thereof. The guiding element can be configured for example for profiled-rail guidance or for cage guidance. The guiding element can also include a cam disk, or can be configured in the form of a cam disk, which actuates the carrier or a coupling element, for example a spring element.

The optical system furthermore includes a first bearing element and a further bearing element for statically supporting the carrier. Said bearing elements thus do not serve for supporting the carrier during the movement but while at a standstill and therefore differ from the movement bearing element. The carrier further includes corresponding bearing elements for providing static support. The optical system can furthermore include at least one drive device for generating a driving force for the movement of the carrier. The drive device can be mechanically coupled to the carrier via at least one coupling element for transmitting the driving force.

According to an aspect of the disclosure, the optical system includes a first and a further end stop element, wherein the carrier is supported movably, in particular linearly movably, between the end stop elements. In other words, the end stop elements limit the movement of the carrier. Furthermore, the first end stop element has or forms the first bearing element for providing static support and the further end stop element has or forms the further bearing element for providing static support. Furthermore, the bearing elements define the stop poses of the carrier and thus also of the optical element attached to the carrier or formed by the carrier in a repetition-accurate manner, that is to say with a predetermined repetition accuracy. In other words, the carrier can thus be moved through a movement into a stop pose, wherein it is statically supported in the stop pose by the first or the further bearing element. In particular, the first or the further bearing element can, in a stop pose, come into mechanical contact with the corresponding bearing element of the carrier.

The stop pose here designates a spatial position or a spatial orientation of the carrier. It can in particular be present in a reference coordinate system. Here, a vertical axis (z-axis) of this reference coordinate system can be oriented parallel to the linear movement axis of a linear movement of the carrier or parallel to the direction of gravity. A longitudinal and transverse axis (x-, y-axis) can be oriented perpendicularly to each other and perpendicularly to the vertical axis. A center of the reference coordinate system can be arranged on the trajectory in the middle between the two stop poses.

The repetition accuracy can in particular be what is known as unidirectional repetition accuracy, since the carrier can be moved only unidirectionally into a stop pose. The repetition accuracy represents the extent of a maximum deviation between the stop poses that occur when moving the carrier into the stop pose multiple times. Said unidirectional repetition accuracy can be determined for example as a standard deviation of the stop pose deviations for a multiplicity of, for example for more than 100, repeated positioning operations into the stop pose. The repetition accuracy is typically less than or equal to 5 μm or 5 arc seconds, with particular preference less than 2 μm or 2 arc seconds. In other words, the configuration of the optical system ensures that the carrier and thus also the optical element adopts the same position and/or orientation with every movement into the stop pose. In particular, the bearing element can be arranged and/or configured such that self-centering of the carrier takes place when being moved into a stop pose.

This also results in the same size of the capture angle defined by the optical system and the same spatial arrangement of the capture region. The optical system is thus used to define two, in particular exactly two, states in which the capture angle and the spatial arrangement of the capture region are always the same, wherein this takes into account the deviations within the repetition accuracy, of course. This is advantageous in particular for applications of optical pose capturing, because it is possible for providing a sufficient resolution to set different capture angles/regions even for different distances of a target, wherein inaccuracies in the setting influence the accuracy of the pose capturing as little as possible. The optical system can also include an image capture device, in particular having an image sensor.

In a further exemplary embodiment, the repetition accuracy of a movement pose of the optical element defined or provided by the movement bearing element is lower than the repetition accuracy in a stop pose. The movement pose can in particular be a pose of the carrier between the two stop poses. The repetition accuracy of a movement pose can represent the extent of a maximum deviation between the actual movement poses that occur for multiple movements of the carrier into a predetermined movement pose, wherein the carrier is supported during these movements by the movement bearing element, that is to say the movement bearing element guides the movement of the carrier. The movement pose thus designates a position and/or orientation of the carrier between the stop poses which can occur due to a movement of the carrier that is supported or guided by the movement bearing element. In other words, the movement bearing element is configured such that, when moving the carrier multiple times into a movement pose, only a repetition accuracy that is lower than the repetition accuracy when moving the carrier multiple times into the stop pose is achievable. The carrier can be moved out of a movement pose into a first stop pose and into a further stop pose, that is to say such a movement is permitted. The carrier can be moved out of the first or further stop pose into a movement pose or into the remaining stop pose.

The accuracy being lower can mean that the value of the repetition accuracy is larger than the value of the repetition accuracy in a stop pose, for example ten times larger. In other words, a movement pose of the carrier is not defined with a repetition accuracy by the movement bearing element in the same way as a stop pose is by the first and the further bearing element. In particular, the floating support of the carrier by way of the movement bearing element can enable sufficient movement guidance, but the play when positioning into a pose is larger than in the case of the static support by way of the bearing elements.

The result is advantageously a simple and cost-effective configuration of the optical system, in particular since there is no need for highly precise manufacturing of the movement bearing element and possibly of the guiding elements provided by said element. It is furthermore also not required to use low-wear materials for producing the movement bearing element, since the effect of wear on the repetition accuracy of a movement pose is less relevant than on the repetition accuracy of the positioning into a stop pose. Furthermore, production is also simplified because, during installation, there is no need for a highly precise arrangement of part elements of the movement bearing element in relation to one another. There is likewise no complexity, or only a low level of complexity, in terms of lubrication for enabling the movement. Overall, this results in low manufacturing and operating costs.

In a further exemplary embodiment, the carrier includes or forms a carrier plate, wherein bearing elements of the carrier corresponding to the first bearing element are arranged on a first side of the carrier plate, and bearing elements of the carrier corresponding to the further bearing element are arranged on a further side of the carrier plate. The first side can here also designate an upper side and the further side can designate a lower side of the carrier plate. Directional terms such as "top", "bottom" can here refer to a direction of the above-explained vertical axis, which is oriented from the bottom to the top when it is oriented from the further to the first bearing element. This advantageously results in a simple configuration of the carrier, which can be statically supported with repetition accuracy by both bearing elements.

In an exemplary embodiment, at least one of the bearing elements for static support is an element of a three-point bearing. This can mean that the first and/or the further bearing element—in interaction with the corresponding bearing elements of the carrier—enable/s three-point bearing of the carrier. A three-point bearing is known here to a person skilled in the art, for example from DE 10 2008 040 218 A1, which was already mentioned in the introductory part. A three-point bearing enables a statically determined support of the carrier in the stop pose. In particular, the first bearing element and the further bearing element can thus enable statically determined support of the carrier in interaction with the respectively corresponding bearing elements of the carrier. A three-point bearing can be provided for example by a bearing element for static support or by the corresponding bearing element of the carrier having or forming three socket elements or socket sections, wherein the remaining bearing element has or forms three corresponding head elements or head sections. A socket section can be formed for example by a pair of balls or partial balls, a pair of rollers or partial rollers, a pair of cylinders or partial cylinders, as a groove, in particular as a groove that is triangular or trapezoidal in cross section, as a conical or frustoconical depression, or in a further manner known to a person skilled in the art. A head element can be formed for example as a sphere, as a partial sphere, as a roller, as a partial roller, as a cylinder, or a partial cylinder. The elements can here be made from a high-strength material, in particular from hardened steel. For static support, the head element or the head section is moved into the receiving cutout formed by the socket section or socket element. The configuration explained here ensures that, when the elements abut against one another, always the same position and/or orientation of the carrier is set. It is of course conceivable that bearing elements having a different configuration are also used for providing the repetition-accurate support. By configuring at least one of the bearing elements as a three-point bearing, it is advantageously ensured that the bearing element is provided as simply as possible, cost-effectively and in a space-saving manner and still ensures the required repetition accuracy.

In a further exemplary embodiment, a drive device of the optical system is mechanically coupled to the carrier via at least one coupling element. This has already been explained above. Furthermore, at least one coupling element is formed as a spring element. This can mean that at least a part of the driving force is used for compensating a spring force and/or is converted into potential energy of a spring element. In particular, the spring element can be arranged and/or formed such that, in the stop pose of the carrier, a spring force that pushes the carrier against the stop elements for static support can be exerted or is exerted on the carrier.

For example, it is conceivable that the spring element is arranged and/or formed such that a first end of the spring element is in a predetermined pose or in a predetermined pose region if the carrier is in a stop pose. In other words, the location or the location region of the first end in a stop pose is fixed. Furthermore, the location of the further end, when the carrier is in the stop pose, can be set for example by operating the drive device in a manner such that a spring force generated by the relative locations of the ends pushes against the carrier such that it can be moved out of the stop pose only counter to the spring force. This advantageously ensures that the carrier adopts the predetermined stop pose and is fixed in the stop pose, in particular without further operation of the drive device (that is to say also without further generating a driving force).

In a further exemplary embodiment, the spring element is formed as a leaf spring or includes at least a leaf spring section. In this case, a free end of the leaf spring/of the leaf spring section can be supported on the carrier, and a further end section can be connected to a further coupling element or to a drive output element of the drive device. The result is a configuration of the spring element that is as simple as possible, and thus also cost-effective and simple manufacturing of the optical system. However, it is alternatively also possible that a rigid coupling element driven by a drive device is connected via a spring element to a further rigid coupling element, which is then connected to the carrier or supported thereon.

In a further exemplary embodiment, the coupling element or a further coupling element is formed as a movement-guided coupling element. For this purpose, the optical system can include at least one bearing and/or guiding element for guiding the movement of the coupling element. The guiding element can be configured for example for profiled-rail guidance or for cage guidance. The coupling element or a further coupling element can in particular be a linear-movement-guided coupling element. It is thus in particular conceivable that a further, linear-movement-guided coupling element is mechanically coupled to the carrier via the at least one spring element. This advantageously results in a simple and reliable transmission of a driving force for a linear movement from the drive device to the carrier.

In an exemplary embodiment, the carrier has at least one receiving section for receiving a coupling element, in particular the spring element or a part thereof, or forms it. The receiving section can in particular be formed as a slot or a groove. Said slot/said groove can be arranged for example in a side surface of a plate-type or cuboid carrier and be open to the outside. A section of the coupling element can project into this receiving section. It is possible that a rigid section or a further section of the coupling element, which differs from a section of the coupling element that is formed as a spring element, projects into the receiving section. In this case, the coupling element can include a section that is formed as a spring element and a section that is formed differently therefrom, for example a rigid section. It is further possible for a dimension of the receiving section to change along its centerline. For example, a width of the slot/of the groove can change along a longitudinal axis of the slot/of the groove. If this longitudinal element projects into the receiving section for example at a first (front) side, the width of this first end can decrease along the longitudinal axis, for example linearly until a predetermined minimum width has been reached. It is possible in this way to ensure, in particular if the coupling element is formed as a leaf spring, that the transmission of force via the coupling element to the carrier takes place as uniformly as possible and no undesirable tilting of the carrier due to a point-wise transmission of force occurs. The result is thus reliable positioning into the stop pose with the required repetition accuracy.

In a further exemplary embodiment, a coupling element coupled to the carrier is movably supported on the carrier, wherein the relative movement between the carrier and the coupling element is limited. For example, a leaf spring or a section of the leaf spring can be supported movably on the carrier. However, it is also possible that for example the rigid or the discussed further section of the coupling element is supported movably on the carrier. Here, too, the result is advantageously that force can be transmitted via the coupling element to the carrier as uniformly as possible, specifically by the coupling element being able to move relative to the carrier, in particular also during the force transmission. Owing to the uniform force transmission, in particular tilting of the carrier and thus also slipping out of the stop pose can be avoided, or the risk thereof can be minimized. The result of this is thus advantageously reliable provision of the repetition accuracy for the positioning into the stop poses.

In a further exemplary embodiment, the optical system includes at least one locking element for locking the carrier in at least one stop pose. Typically, the optical system includes a locking element for locking the carrier in both stop poses. With the locking element, the carrier can be fixed in the stop pose(s), wherein the fixing does not require the generation of any driving force by the drive device. The locking element in a locking state can here ensure the stated fixation. However, it is also possible to place the locking element into a non-locking state by enabling the movement of the carrier out of the stop pose. It is possible to place it into the non-fixed state for example by exerting a predetermined force on the carrier for movement out of the stop pose. The result of this is advantageously an energy-saving operation of the optical system and reliable permanent positioning of the carrier in a stop pose.

In a further exemplary embodiment, the locking element is formed for locking a coupling element. In other words, the force for locking the carrier in a stop pose is exerted not directly by the locking element on the carrier but by the locking element on a coupling element and is then transmitted from said coupling element to the carrier. This advantageously results in a simple mechanical production of the optical system. Furthermore, undesirable movements of the carrier out of the stop pose are also prevented due to locking forces exerted on the carrier.

In a further exemplary embodiment, the locking element includes a leaf spring and a ball bearing, in particular for interaction with the coupling element, with the carrier, or a carrier structure/housing of the optical system. The locking element can thus be arranged and/or formed in a manner such that the leaf spring produces the locking force and transmits it via the ball bearing to the coupling element, to the carrier, or to the carrier structure/the housing. The coupling element, the carrier, or the carrier structure/the housing can have or form sections that are configured for said transmission of force. In this case, a first free end of the leaf spring can be attached for example to a carrier structure or a housing of the optical system, wherein a ball bearing is arranged at a further end. Said ball bearing can dip into a depression or cutout in the carrier or in a coupling element in order to bring about a locked state. For example, the locking element can thus be arranged and/or formed in a manner such that the ball bearing dips into the depression when the carrier is in the stop pose or when the coupling element has a pose that comes about when the carrier is in the stop pose. The result of this is a mechanically simple, cost-effective yet reliably functioning locking of the carrier.

In a further exemplary embodiment, the optical system includes or forms elements of at least one electrical circuit, wherein the electrical circuit is closed when the carrier is in one of the two stop poses.

Furthermore, the electrical circuit is closed when the carrier is not in a stop pose. For example, the at least one electrical circuit can be closed when one, several but not all, or all of the previously mentioned corresponding bearing elements of the carrier come into mechanical contact with the bearing elements for providing static support. This can be the case in particular if a head element or a head section comes into mechanical contact with a corresponding socket section or a corresponding socket element.

The optical system can of course also include elements of a plurality of circuits, wherein a first electrical circuit is closed when the carrier is in a first stop pose and a further electrical circuit is closed when the carrier is in the further stop pose.

Such an optical system advantageously enables reliable detection of whether the carrier is in a stop pose. For example, it is thus possible to detect that the carrier is in a stop pose when it is detected that the electrical circuit is closed. The electrical circuit being closed can be detected for example when a flow of current through the electrical circuit is larger than a predetermined threshold value.

Further provided is a method for operating an optical system according to one of the exemplary embodiments described in this disclosure. In this case, the carrier is moved between the stop poses, in particular into a first stop pose or into a further stop pose. For this purpose, a drive device of the optical system can be controlled to produce a corresponding driving force. Control signals for the drive device can here be generated by a controller, which can be configured in particular as a microcontroller or an integrated circuit, or include it. The optical system can here include a corresponding controller for generating the control signals. However, it is also possible for the controller to be a device of a higher-level system that generates control signals in dependence on an application scenario.

Owing to the movement into the first stop pose, it is possible for example to set a capture region with a first capture angle. Owing to the movement into the further stop pose, it is possible to set a capture region with a further capture angle. In this case, for example, the further capture angle can be smaller than the first capture angle. However, it is possible that the optical axes of the capture regions are arranged concentrically in the stop poses. Owing to the movement into the stop poses, it is of course also possible for further parameters of the optical system, for example a focal point position, to be set to differing values specific to the stop poses.

In a further exemplary embodiment, after the movement of the carrier into a stop pose, it is checked whether the carrier is in the stop pose. This can be checked for example by checking whether—as explained above—an electrical circuit is closed. If it is detected that the carrier is in a stop pose, the drive device can be deactivated, or a moment produced by the drive device can be reduced. This advantageously results in a reliable and energy-saving operation of the optical system.

Further described is a microscopy system having an optical system according to one of the exemplary embodiments described in this disclosure. The microscopy system includes a microscope. Within the meaning of this disclosure, a microscope designates a device for magnified visual presentation of an examination object. The microscope can be a classical light microscope, which generates an enlarged image by utilizing optical effects, in particular by means for beam guidance and/or beam shaping and/or beam deflection, for example lens elements. However, the microscope can also be a digital microscope, wherein the image to be visualized by the microscope can be produced with an image capture device and can be displayed on an appropriate display device, for example a display unit.

Moreover, the microscope can include a microscope body. The microscope body can have or form a beam path for microscopic imaging. The microscope body can in this case include further optical elements for beam guidance and/or beam shaping and/or beam deflection. An objective of the microscope body can be integrated into the microscope body or be attached thereto, in particular releasably. The objective can in this case be arranged in a fixed position relative to the microscope body.

The microscopy system can include a tracking camera for determining the location of a target. The optical system described in this disclosure can form an optical system of said tracking camera, in particular guide rays to an image sensor of the tracking camera. The optical system can be integrated into the microscope body. A beam path of the optical system of the tracking camera can differ from the beam path for microscopic imaging, in particular can be configured to be separate therefrom.

The microscopy system can include at least one device for determining a predetermined working distance of the tracking camera. This predetermined working distance of the tracking camera can designate a distance between a plane of focus and a terminating element of an optical system of the tracking camera along an optical axis of the tracking camera that is defined by the objective system. The terminating element can be, for example, a lens element (front lens) of the objective system or a transparent terminating plate. The plane of focus or plane of detection can designate a plane in the object space, wherein an object in said plane is imaged with a desired sharpness. Said plane can be oriented orthogonally to the optical axis of the tracking camera which intersects the plane of focus at the center of the depth-of-field range. The depth-of-field range is dependent in a known manner on a currently set focal length, the currently set distance, and also the currently set aperture. It is thus possible in particular to determine the plane of focus and thus also the predetermined working distance in dependence on at least one of the aforementioned variables. Other methods for determining the predetermined working distance are of course also conceivable.

The predetermined working distance of the tracking camera will typically be determined in dependence on a working distance of the microscope, for example with a previously known assignment. A predetermined working distance of the tracking camera can be assigned to a working distance region of the microscope by way of the assignment. The working distance of the microscope can be determined in an automated manner, for example via an autofocus function. Said autofocus function can be carried out for example by a focusing device of the microscopy system, wherein for example an image distance of an objective of the microscope is set, wherein a working distance is assigned to a set image distance, or a working distance can be determined from a set image distance, for example via a predetermined function, in particular a polynomial curve function. For example, it may thus be assumed that a distance of a marker, in particular if the latter is arranged at an instrument, from the tracking camera of the microscopy system corresponds exactly or approximately to the working distance of the microscope, in particular because a surgeon also uses/moves the instrument with such a marker generally in the region that is sharply imaged by the microscope.

The pose of the carrier with the movable optical element is variable for setting a capture region of the tracking camera. In particular, a viewing angle of the tracking camera can be changed by way of the change in pose. The location of a focal point of the optical element or of an optical system including the optical element, which can also be referred to as an objective system, can also be changed by the movement of the optical element. The pose of the movable optical element is typically settable in dependence on the predetermined working distance. For example, different poses of the movable optical element can be assigned in each case to different predetermined working distances or different predetermined working distance regions, wherein, for a predetermined working distance, the pose that is assigned to said predetermined working distance or to the region in which the predetermined working distance is located is set. For example, the assignment of a working distance of the microscope to a predetermined working distance of the tracking camera can be determined by a calibration method. It is also conceivable that a functional relationship between the pose and the predetermined working distance exists, wherein the pose can then be ascertained by evaluating the relationship of a predetermined working distance. The different settable poses of the movable optical element define different capture regions, in particular capture regions with differing capture angles. In particular, exactly one predetermined working distance or predetermined working distance region can be assigned to each of the two stop poses.

BRIEF DESCRIPTION OF THE DRAWINGS

The disclosure will now be described with reference to the drawings wherein.

DESCRIPTION OF EXEMPLARY EMBODIMENTS

Identical reference signs hereinafter denote elements having identical or similar technical features.

Figure 1:
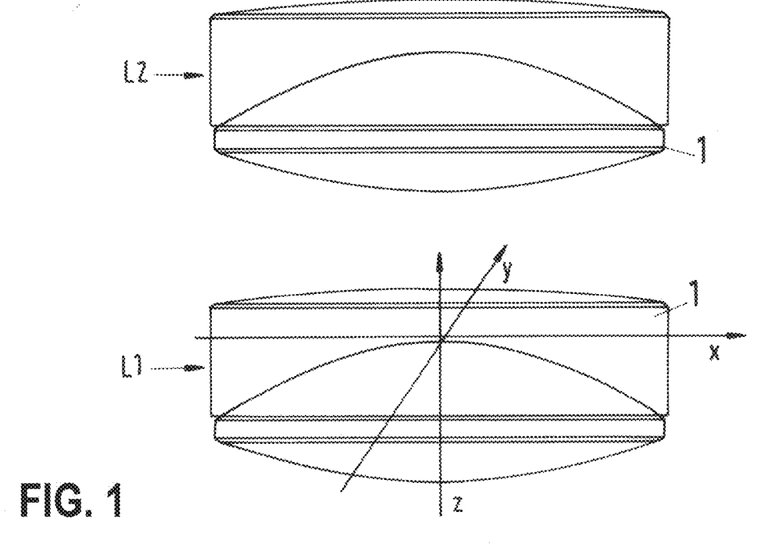
FIG. 1 shows a schematic illustration of an optical element at two stop poses.

FIG. 1 shows a schematic illustration of an optical element 1 of an optical system 2 (see FIG. 6A) in a first stop pose L1 of a carrier 3 and in a further stop pose L2 of the carrier 3. FIG. 1 furthermore illustrates a coordinate system with a vertical axis z, a longitudinal axis x, and a transverse axis y. Said axes x, y, z form spatial axes. Spatial axes are represented by arrows of the spatial axes x, y, z. A vertical direction is thus oriented from the first stop pose L1 to the second stop pose L2. This orientation can correspond to an orientation from the bottom to the top. The optical element 1, which can be configured in particular in the form of a lens element or cemented member, is supported linearly movably along the vertical axis. Consequently, the optical element can be moved with a linear movement between the first stop pose L1 and the further stop pose L2. As will be explained in more detail below, the position and the orientation of the optical element 1 in relation to the reference coordinate system are defined with repetition accuracy in the stop poses L1, L2. This can mean that, when the optical element is repeatedly positioned in a stop pose L1, L2, a position deviation of a reference point of the optical element 1, for example of a geometric center, is less than a predetermined extent, for example less than two micrometers. This can furthermore mean that an angle deviation with respect to each of the three axes x, y, z of the reference coordinate system is smaller than a predetermined angle, for example smaller than 2 arc seconds. The movable optical element 1 is thus positionable in exactly two different spatial poses, specifically the stop poses L1, L2, with a repeatable, that is to say reproducible, accuracy. An absolute positional accuracy is here not essential. However, it can be achieved by manufacturing and installing the bearing elements with a precision that is sufficient for the desired absolute accuracy, in particular with suitable apparatuses.

Figure 2:
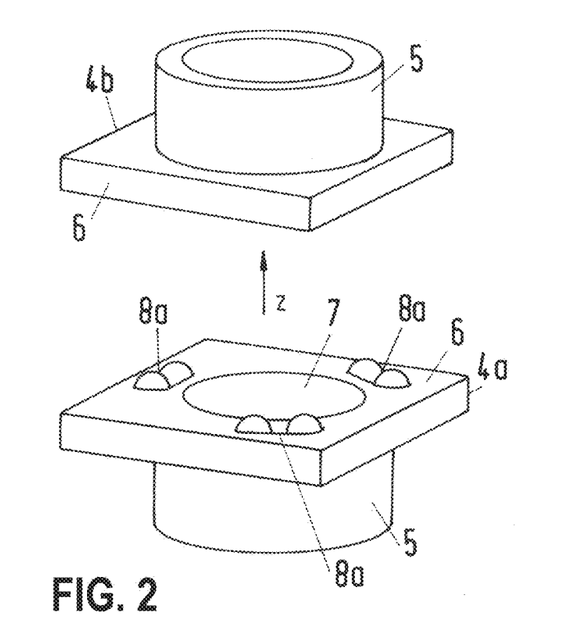
FIG. 2 shows a perspective illustration of two end stop elements of an optical system.

FIG. 2 shows a perspective view of a first end stop element 4a and a further end stop element 4b. FIG. 2 furthermore illustrates the vertical axis z of the reference coordinate system as is likewise illustrated in FIG. 1. As can be seen, each of the two end stop elements 4a, 4b includes a hollow-cylindrical section 5. However, the end stop elements 4a, 4b can conceivably also be configured differently than in the illustration in FIG. 2, wherein the configuration is such, however, that a beam path for the rays to be captured is provided. Both end stop elements 4a, 4b further include a plate-type section 6, wherein said plate-type section 6 is arranged on a front side of the respective hollow-cylindrical section 5 and has a through opening 7 whose central axis of symmetry is concentric to the central axis of symmetry of the inner volume of the hollow-cylindrical section 5 and whose diameter is identical to the diameter of the inner volume. Radiation can be guided through the end stop elements 4a, 4b through said through opening 7 and the inner volume of the hollow-cylindrical section 5. In a peripheral section of the plate-type section 6 surrounding the through opening 7, first bearing elements 8a forming a three-point bearing are arranged at the first end stop element 4a. Each of the three bearing elements 8a includes a ball pair, the balls of which are embedded in, in particular adhesively bonded into, the peripheral section and project out of it. The balls of one ball pair are furthermore arranged at a distance from one another and thus form a receiving volume for a corresponding bearing element 9a of a carrier 3. The ball pairs can also be referred to as socket elements of the three-point bearing. The ball pairs are here arranged along a circular line around the through opening 7, wherein a diameter of said circular line is larger than the diameter of the through opening 7. Angular distances between the ball pairs that neighbor one another along the circular line are here identical.

FIG. 2 does not show that the plate-type section 6 of the further end stop element 4b likewise has three bearing elements 8b (see, for example, FIG. 5), which are configured corresponding to the bearing elements 8a of the first end stop element 4a. These bearing elements 8b also form a three-point bearing for the carrier 3 and the optical element 1 attached to the carrier 3, wherein said bearing elements 8b interact with corresponding bearing elements 9b of the carrier 3 (see FIG. 5).

FIG. 2 illustrates that the end stop elements 4a, 4b are arranged at a predetermined distance from one another along the vertical axis z. A carrier 3 arranged between the end stop elements 4a can thus be moved between the end stop elements 4a, 4b, in particular with a linear movement until it abuts against one of the end stop elements 4a, 4b. Upon abutting, the corresponding bearing elements 9a of the carrier 3 begin interacting with the bearing elements 8a, 8b of the corresponding end stop element 4a, 4b. The stop pose of the carrier 3 and thus also of the optical element 1 is adjusted set and defined hereby, in particular because the configuration of the bearing elements 8a, 8b, 9a, 9b (see FIG. 5) ensures that, with each movement along an abutment direction into the stop pose, the carrier 3 is always moved into the same relative position and relative orientation with respect to the end stop element 4a, 4b, wherein said relative position and relative orientation are established when the carrier 3 abuts the end stop element 4a, 4b and a further movement along the abutment direction is blocked.

Figure 3:
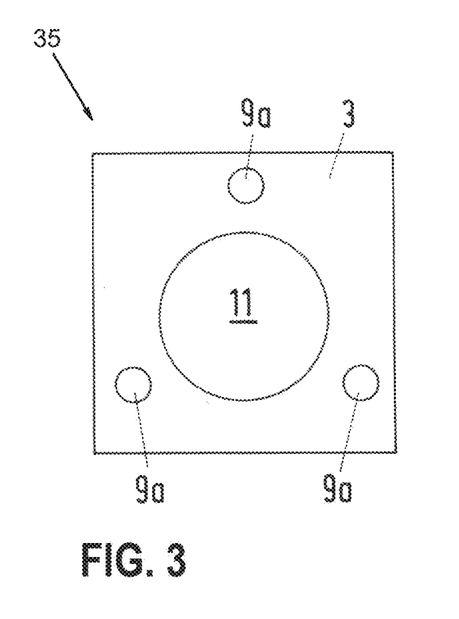
FIG. 3 shows a schematic plan view of a carrier of an optical system.

FIG. 3 shows a schematic plan view of a carrier 3, in particular a lower side of the carrier 3. Said figure shows that the carrier 3 forms carrier plate 35. In other words, the carrier 3 is formed as a plate-type or cuboid element and has a through opening 11 having a diameter that is larger than or equal to the diameter of the through opening 7 of an end stop element 4a, 4b. Corresponding bearing elements 9a, which are formed as balls and are embedded in, in particular adhesively bonded into, the carrier 3, are arranged on a lower side of the carrier 3 in the peripheral section that surrounds the through opening 11, wherein a partial section of the balls projects from the lower side. Furthermore, the balls are arranged along a circular line around the through opening 11, wherein angular distances between balls that neighbor one another along the circular line are identical. The diameter of this circular line corresponds to the diameter of the circular line along which the bearing elements 8a are arranged.

Figure 4:
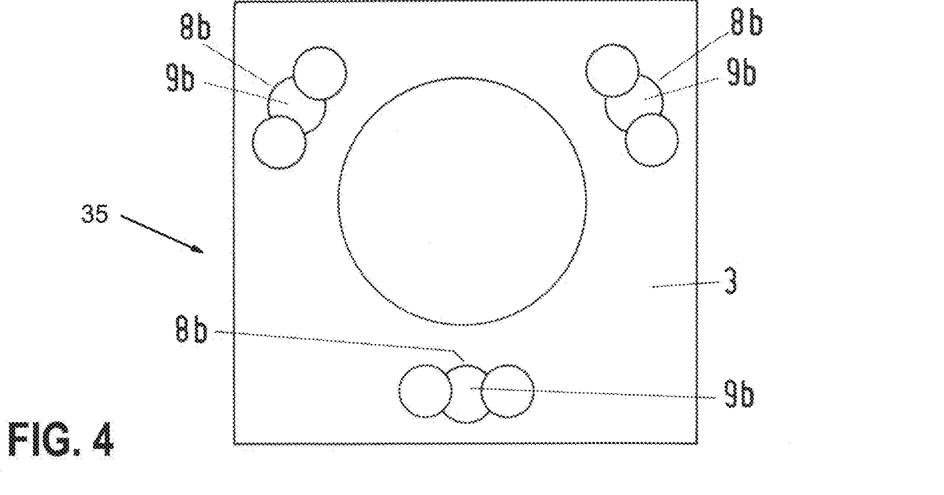
FIG. 4 shows a schematic plan view of a carrier with the additional illustration of a bearing element for providing static support.

FIG. 4 shows an upper side of the carrier 3 with the corresponding bearing elements 9b that are formed as balls. Said bearing elements 9b are embedded in, in particular adhesively bonded into, the carrier 3 at an upper side thereof, wherein a partial section of the balls projects from the upper side. These balls are also arranged along a circular line around the through opening 11. Angular distances between the ball centers are here identical between balls that neighbor one another along the circular line. Also shown are the corresponding bearing elements 8b of the further end stop element 4b. The diameter of the circular line along which the bearing elements 9b are arranged is identical to the diameter of the circular line along which the bearing elements 8b are arranged.

Also shown is that the carrier is in the further stop pose, wherein in this stop pose the corresponding bearing elements 9b come into mechanical contact with the bearing elements 8b. In particular, the corresponding bearing elements 9b, which form the head elements of the three-point bearing, are in particular arranged in the receiving sections formed by the bearing elements 8b.

Figure 5:
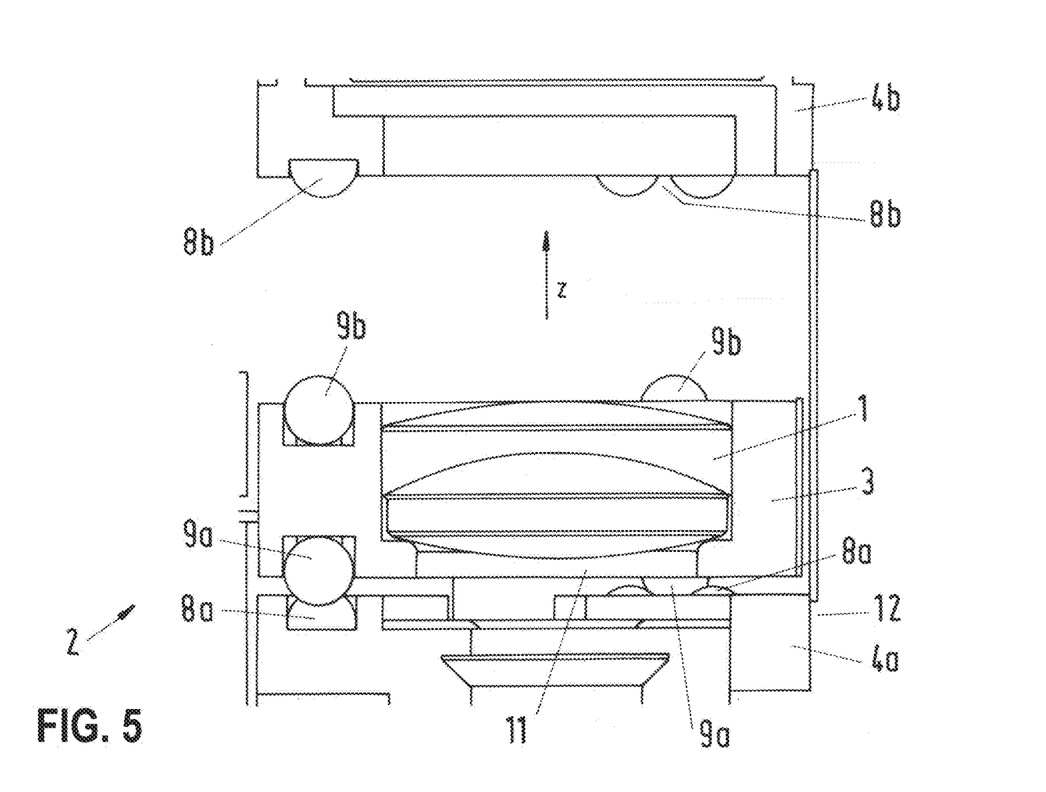
FIG. 5 shows a schematic cross section through an optical system.

FIG. 5 shows a schematic cross section through an optical system 2. It illustrates the carrier 3 with the optical element 1, which is attached to the carrier 3. It also shows the end stop elements 4a, 4b, which are arranged at a distance from one another along a vertical direction z. Said end stop elements 4a, 4b are arranged in a housing 12 of the optical system 2, in particular on a lower side and an upper side of the housing 12. Said figure furthermore illustrates the bearing elements 8a of the first end stop element 4a and the bearing elements 8b of the further end stop element 4b. It likewise illustrates the carrier 3 with the corresponding bearing elements 9b, 9a, which are arranged on a lower side or an upper side. It furthermore illustrates that the through opening 11 of the carrier 3 has a stepped configuration. This can mean that a diameter of the through opening changes along the central centerline of the through opening 11, in particular in a stepped or abrupt manner. An abutment surface for abutment of the optical element 1 is thus formed. The optical element 1 can be inserted into the through opening up to the abutment surface and then be adhesively bonded to the carrier 3.

FIG. 5 illustrates that the carrier 3 is in the first stop pose. By being moved along the vertical direction z, the carrier 3 can be moved up to the further end stop element 4b. If the carrier abuts said end stop element 4b, it is in a further stop pose, which is defined with repetition accuracy by the bearing elements 8b, 9b.

Said figure also illustrates that the carrier 3 is supported in the housing 12, wherein side walls of the housing 12 form bearing surfaces for a plain bearing. It is evident here that a diameter of the carrier 3 or a width or length of the carrier 3 in a cross-sectional plane orthogonal to the vertical axis z is smaller by a predetermined extent than a diameter or a width or length of the inner volume enclosed by the housing 12, in which the carrier 3 can be moved. The result of this is a play for the carrier 3 in movement poses, that is to say poses between the stop poses, and thus also for the optical element 1, that is larger than the play in the stop poses. In other words, the repetition accuracy of a movement pose of the optical element 1, defined by the housing 12, is less than the repetition accuracy in a stop pose L1, L2 (see FIG. 1).

Figure 6A:
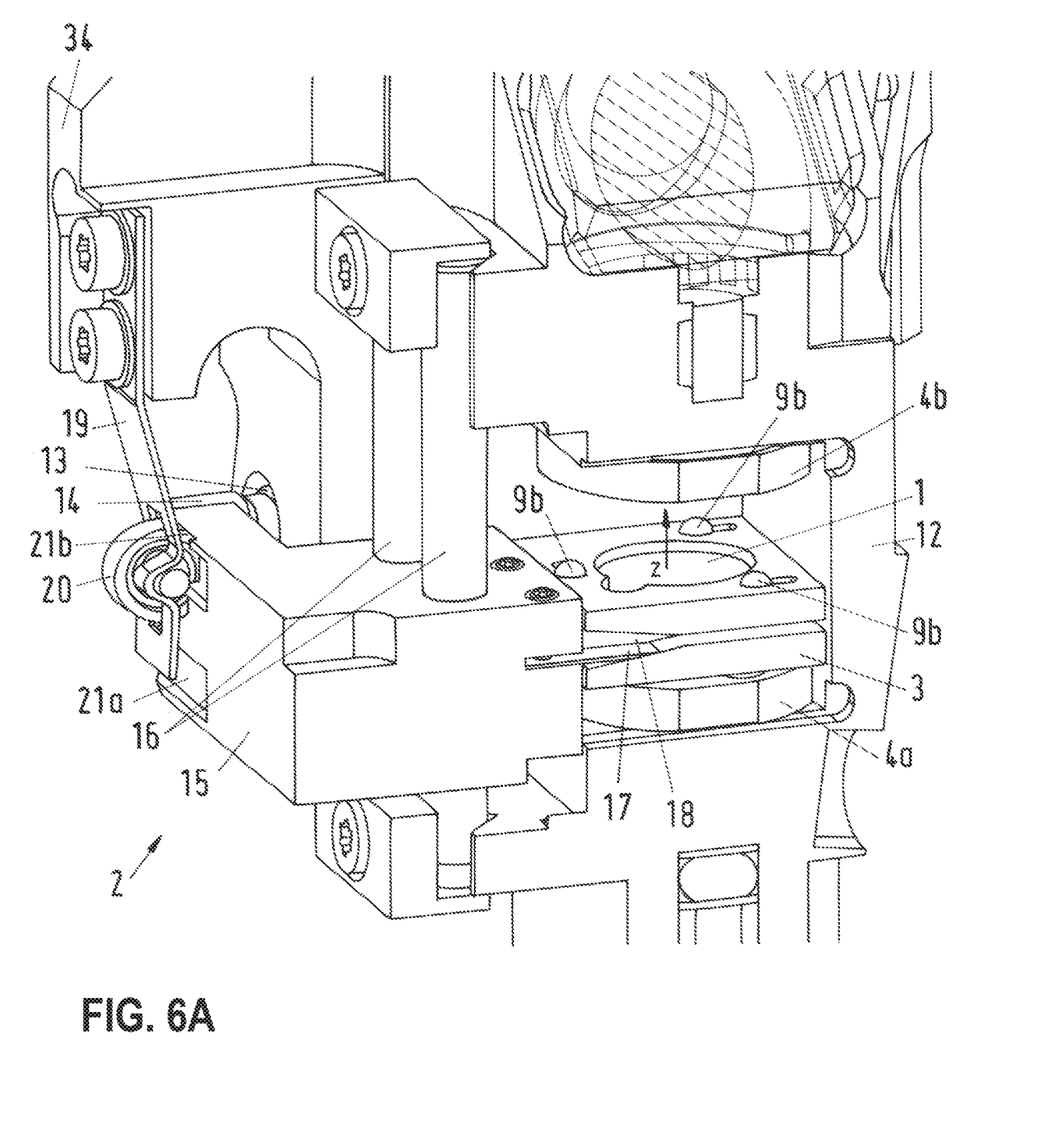
FIG. 6A shows a schematic perspective view of an optical system.
Figure 6B:
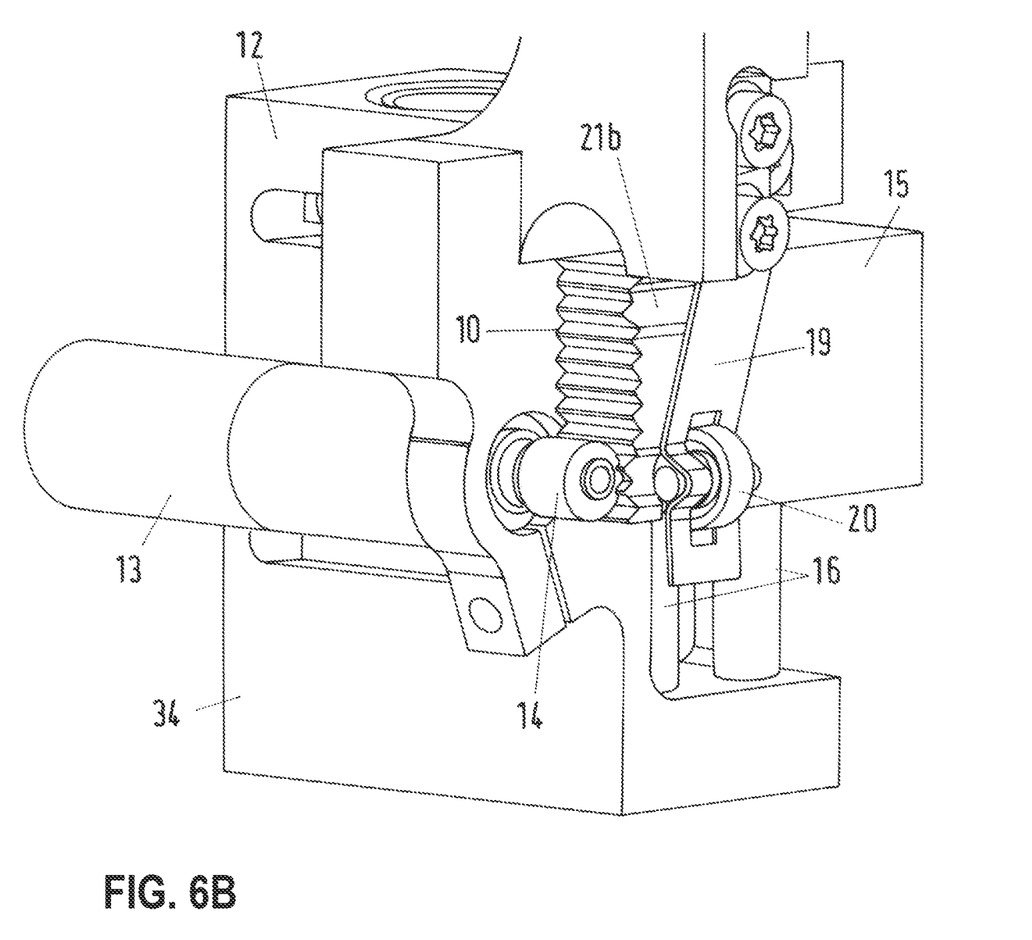
FIG. 6B shows a further schematic perspective view of the optical system illustrated in FIG. 6A.

FIG. 6A and FIG. 6B show different perspective views of an optical system 2. They illustrate the housing 12 for receiving the carrier 3 and the end stop elements 4a, 4b. The housing 12 is formed by a carrier structure 34 or is attached thereto. The carrier structure 34 can be part of the optical system 1. Said figure schematically illustrates the optical element 1, which is attached to the carrier 3, and also corresponding bearing elements 9b on an upper side of the carrier 3. It furthermore illustrates a drive device 13 having a drive output element 14 in the form of a pinion. The drive device 13 is attached to the carrier structure 34.

Said pinion element 14 engages in a rack section 10 (see FIG. 6B) of a first coupling element 15. The drive device 13 can be formed as a servo motor, DC motor, or stepper motor. The first coupling element 15 is a movement-guided coupling element. For the purpose of movement guidance, the optical system 2 has guiding rods 16 which project through openings in the first coupling element 15. A central centerline of said guiding rod 16 is here oriented parallel to the vertical axis z. If the drive output element 14 is driven by the drive device 13, the first coupling element 15 is guided in or counter to the vertical direction, wherein said movement is a linear movement and guided by the guiding rods 16. Further illustrated is a leaf spring 17, wherein a first end of the leaf spring 17 is attached to the first coupling element 15, in particular is screw-connected thereto. A further end is supported movably on the carrier 3. It is evident that the leaf spring 17 projects from the first coupling element 15 into a receiving section 18, which is formed by the carrier 3. If the first coupling element 15 is then moved in or counter to the vertical direction, a force can be transmitted from the first coupling element 15, via the leaf spring 17, to the carrier 3, as a result of which the carrier 3 is moved. In particular, the carrier 3 can hereby be moved between the first and the further stop pose L1, L2. The leaf spring 17 therefore likewise forms a coupling element.

Also illustrated is a locking element of the optical system 2, which includes a further leaf spring 19 and a ball bearing 20. A first end of the further leaf spring 19 is here attached to the carrier structure 34, in particular is screw-connected thereto. The ball bearing 20 is arranged on a further end of the further leaf spring 20. The first coupling element 15 has two receiving sections 21a, 21b for receiving a part of the ball bearing 20. Said receiving sections are arranged such that the ball bearing 20 is pushed against the first receiving section 21a by the further leaf spring 19 when the coupling element 15 is in a pose in which the carrier 3 is positioned in the further stop pose L2. This state is illustrated in FIG. 6B. Accordingly, the further receiving opening 21b is arranged such that the ball bearing 20 is pushed into it by the further leaf spring element 19 when the first coupling element 15 is in a position in which the carrier 3 is in the first stop pose L1. This state is illustrated in FIG. 6A. The first coupling element 15 and thus also the carrier 3, which is connected to the coupling element 15, is locked hereby in the corresponding stop pose L1, L2. However, if the drive device 13 exerts a sufficiently high torque, the ball bearing 20 is pushed out of the corresponding cutout 21a, 21b, and the first coupling element 15 (and thus also the carrier 3) can move out of the locked pose.

Figure 7:
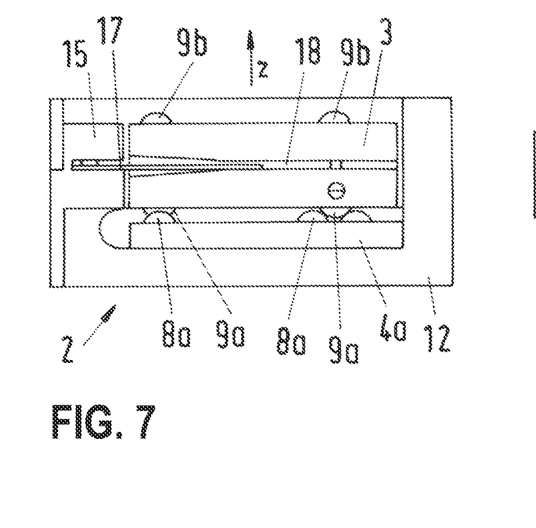
FIG. 7 shows a schematic cross section through a carrier in a first state of the optical system.

FIG. 7 shows a schematic cross section through an optical system 2. It illustrates the housing 12 and also the first end stop element 4a with the bearing elements 8a. It likewise illustrates the carrier 3 with the corresponding bearing elements 9a, 9b. It likewise illustrates a section of the first coupling element 15 in which the leaf spring element 17 is attached to the first coupling element 15. It furthermore illustrates the receiving section 18, which is formed by the carrier 3 for the leaf spring 17.

The receiving section 18 is formed as a groove extending along a side surface of the carrier 3 in a direction perpendicular to the vertical direction. Said figure illustrates that, in a partial section of the receiving section 18, a width of the receiving section 18 that is measured along the vertical direction increases in size up to the first coupling element 15. Consequently, a width of the receiving section 18 changes along a longitudinal extent of the receiving section 18. The width in the remaining partial section, however, is constant. This configuration of the receiving section 18 allows, in interaction with the spring properties of the leaf spring 17, the most uniform force transmission possible from the first coupling element 15 to the carrier 3, which prevents tilting of the carrier 3 in a stop pose L1, L2 or reduces the risk thereof.

Figure 8:
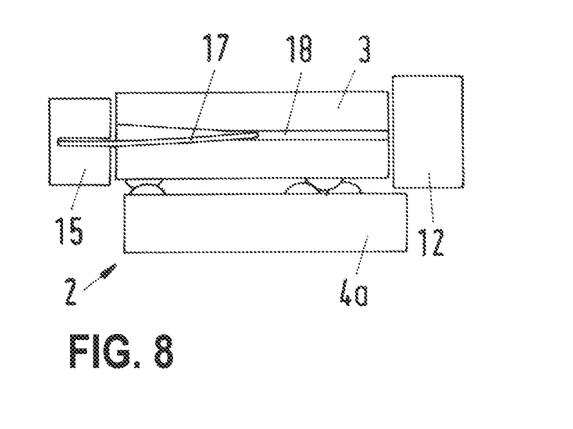
FIG. 8 shows a schematic cross section through a carrier in a further state.

FIG. 8 illustrates a state of the optical system 2 in which the first coupling element 15 is positioned by the operation of the drive device 13 (see FIG. 6A) in a manner such that a contact force is exerted on the carrier 3 by the leaf spring 17 when said carrier is in a stop pose, in the present case the first stop pose L1. Here, the first coupling element 15 is moved such that the leaf spring 17 is pressed against a side wall of the receiving section 18 and bends. Due to the change in width and the spring properties of the leaf spring element 17, the leaf spring 17 is uniformly pressed against the side wall of the receiving section 18 and the contact force is thus uniformly distributed over said side wall. In comparison with an exemplary embodiment in which for example the leaf spring 17 is formed as a mechanically rigid element, for example as a rigid metal tongue, and/or the receiving section 18 is formed with a constant width, a reliable transmission of a contact force to the carrier 3 is achieved because a contact force in the stated alternative exemplary embodiment is exerted mainly on a section of the carrier 3 that neighbors the first coupling element 15 and distributed less than in the case of the illustrated exemplary embodiment, as a result of which the risk of the carrier 3 tilting is increased.

Figure 9:
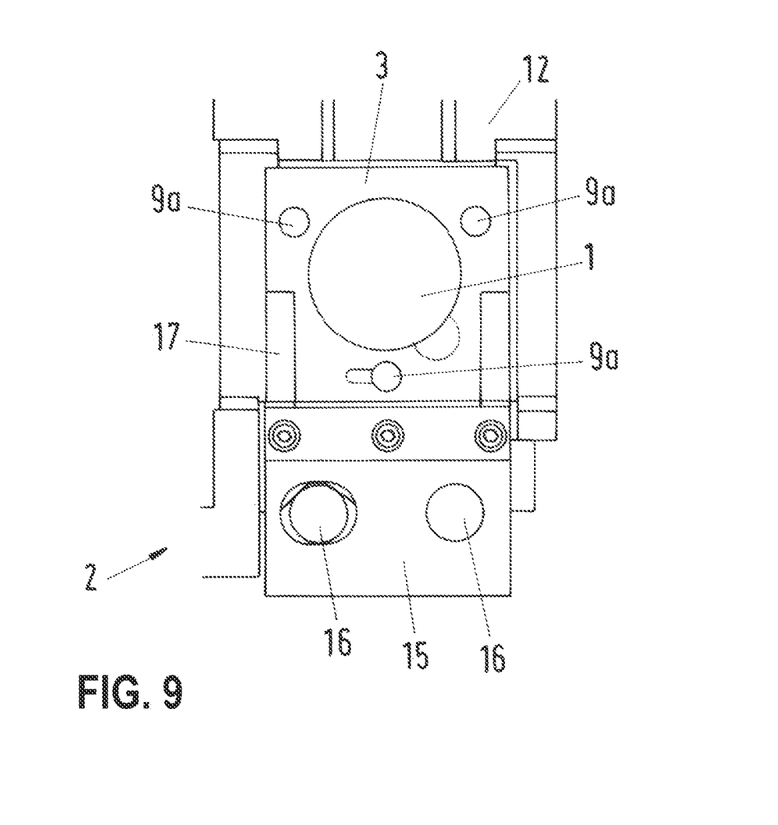
FIG. 9 shows a schematic cross section through an optical system.

FIG. 9 shows a schematic cross section through an optical system 2 in a further exemplary embodiment. It illustrates the carrier 3 with the optical element 1 attached thereto. It furthermore illustrates the housing 12, in which the carrier 3 is movably supported. Furthermore evident are the first coupling element 15 and the guiding rods 16, which extend through the first coupling element 15. Said figure illustrates that a through opening of the first coupling element 15 has larger dimensions than the guiding rod 16 extending through said opening, resulting in a play in the corresponding movement guidance.

It likewise illustrates the leaf spring 17. It is evident that said leaf spring is formed as a U-shaped profile element, wherein the two legs of the U-shaped profile element extend from the first coupling element 15 to the carrier 3 and in particular into the receiving sections 18 thereof (see for example FIG. 7). A base section of the profile element is screw-connected to the first coupling element 15. Consequently, a driving force can be transmitted by the drive device 13 (see FIG. 6A) via the first coupling element and both legs of the spring element 17 to the carrier 3. In particular, the legs of the U-shaped profile element project into two receiving sections 18, which are arranged on two opposite sides of the carrier 3.

Figure 10:
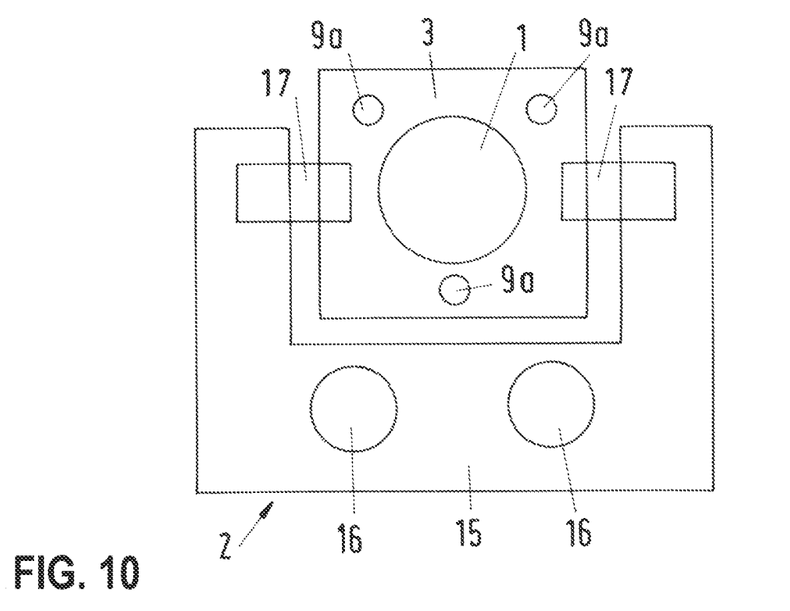
FIG. 10 shows a schematic illustration of an optical system in a further exemplary embodiment.

FIG. 10 shows a schematic cross section through an optical system 2 in a further exemplary embodiment. This figure shows again the first coupling element 15 and the guiding rods 16. Here, the first coupling element 15 is formed with a U-shaped profile in a cross-sectional plane perpendicular to the vertical axis z (see for example FIG. 6A). A base section of the first coupling element 15 has through holes for receiving the guiding rods 16. Leaf springs 17, which are attached to the first coupling element 15 and extend into receiving sections 18 (not illustrated) of the carrier 3, are arranged in each case at free ends of the leg sections of the first coupling element 15.

Figure 11:
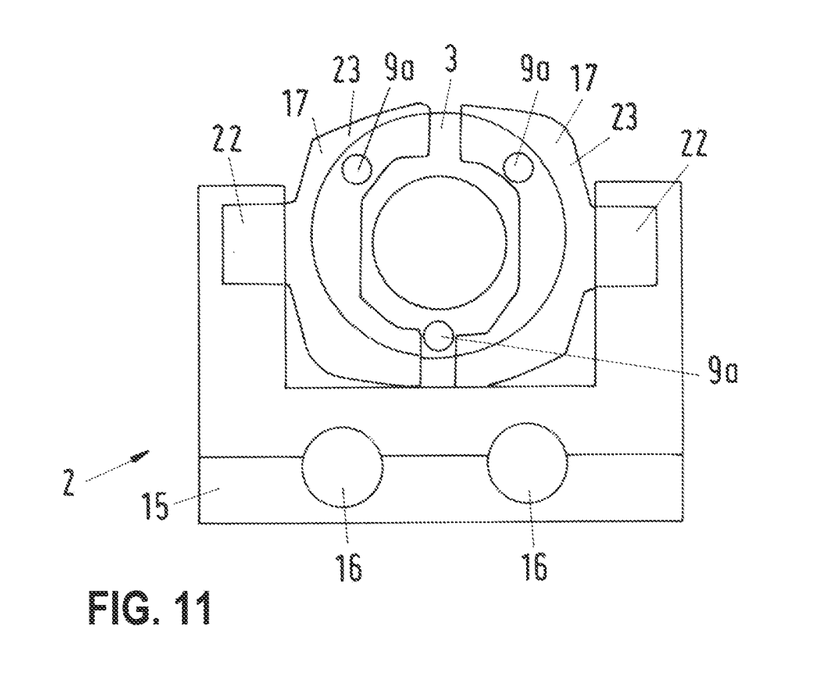
FIG. 11 shows a schematic cross section through an optical system in a further exemplary embodiment.

FIG. 11 shows a schematic cross section through an optical system 2 in a further exemplary embodiment. In contrast to the exemplary embodiment illustrated in FIG. 10, the leaf spring elements 17 are not cuboid but include a base section 22, which is attached to the first coupling element 15, and a semiannular section 20, which is arranged at least in part in a receiving section 18 (not illustrated) of the carrier 3. The semiannular section 20 here includes a part of the carrier 3. A further improved transmission of force from the first coupling element 15 to the carrier 3 can be realized hereby.

Figure 12:
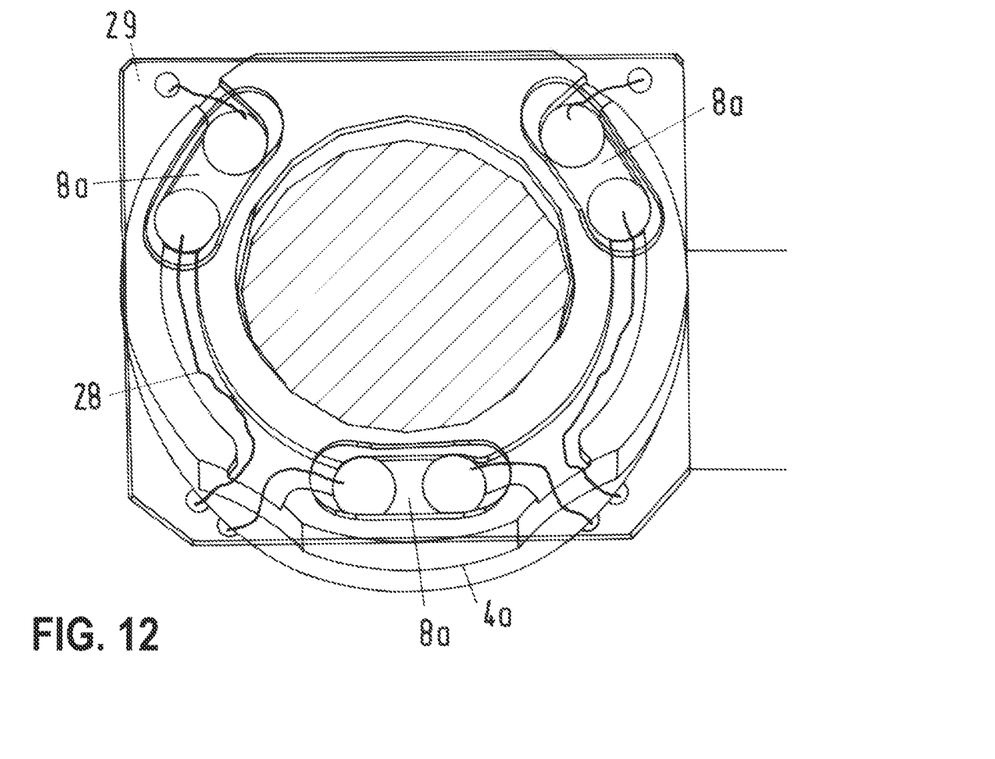
FIG. 12 shows a perspective view of an end stop element.

FIG. 12 shows a schematic perspective view of the first end stop element 4a. Said figure illustrates the electrical lines 28, via which the electrically conductive balls of the bearing elements 8a are connected to a printed circuit board 29. The electrical lines can here be elements of a circuit. The printed circuit board 29 can also have or form elements of the circuit. Said circuit can be closed when the corresponding bearing elements 9a, which can likewise be electrically conductive, are in the first stop pose L1 (see FIG. 1) and in that case make contact with the balls of the bearing elements 8a. Consequently, a mechanical contact and also an electrical contact are established and the circuit is closed. It is possible hereby to detect that the carrier 3 is in the stop pose L1.

Figure 13:
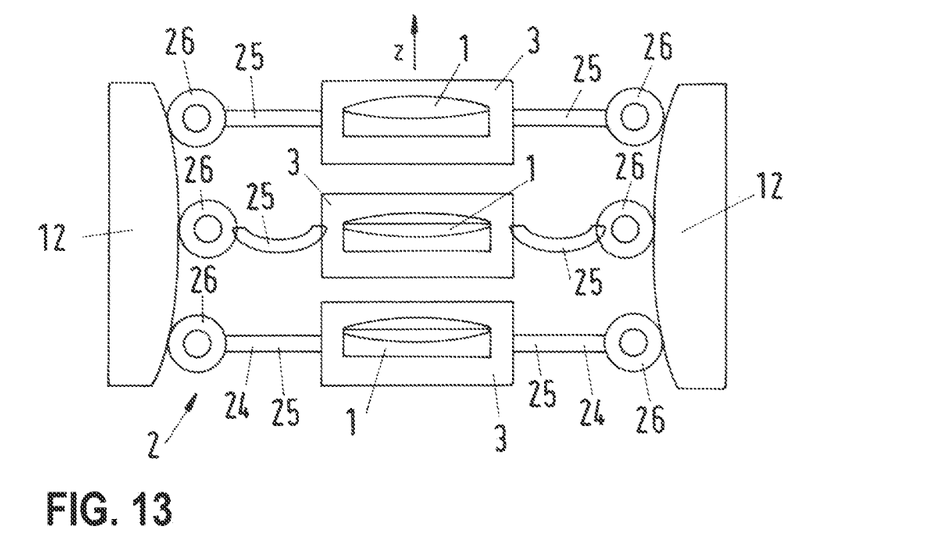
FIG. 13 shows a schematic illustration of an optical system in a further exemplary embodiment.

FIG. 13 shows a schematic view of an optical system 2 in a further exemplary embodiment. It illustrates a housing 12, in which the carrier 3 with the optical element 1, which is attached to the carrier 3, is movably supported. Movement bearing elements 24, which include a leaf spring section 25 and a ball bearing 26, are attached to the carrier 3. It further illustrates that the housing 12 includes concave wall sections, which project into the inner volume in which the carrier 3 is movably supported. The surfaces of these concave wall sections form rolling faces for the ball bearings 26. If the carrier 3 is moved along or counter to the vertical direction, the movement bearing element 24, in particular the leaf spring section 25, can deform.

Figures 14, 15:
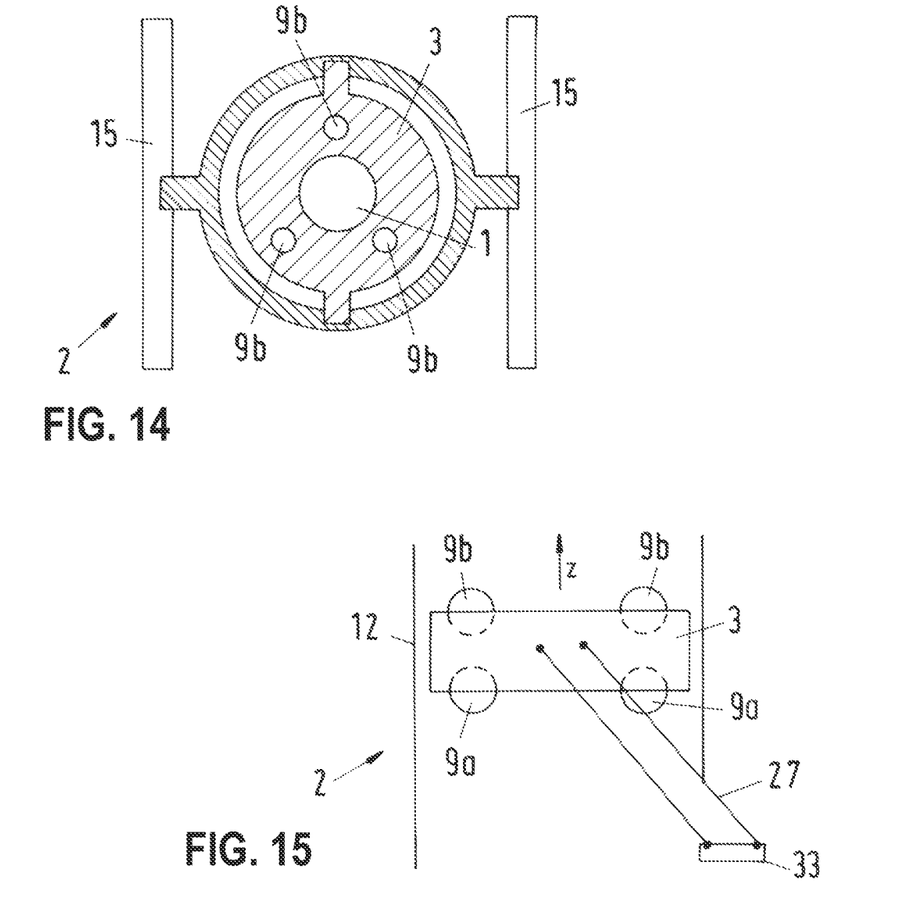
FIG. 14 shows a schematic illustration of an optical system in a further exemplary embodiment.
FIG. 15 shows a schematic illustration of an optical system in a further exemplary embodiment.

FIG. 14 shows a schematic cross section through an optical system 2 in a further exemplary embodiment. It illustrates the carrier 3 with corresponding bearing elements 9b. The carrier 3 is gimbaled on the first coupling element 15. The gimbaled support enables in particular a rotation of the carrier 3 about a longitudinal axis x (not illustrated) and transverse axis y (see FIG. 1) of a reference coordinate system. The first coupling element 15 can here be moved—as previously explained—in and counter to the vertical direction. Said vertical direction is oriented perpendicular to the plane of the drawing in the illustrated exemplary embodiment.

FIG. 15 shows an optical system 2 in accordance with a further exemplary embodiment. It illustrates that the carrier 3 is coupled, via a coupling joint 27, to a linear drive device 28, wherein the latter can perform a linear movement along an axis that is oriented perpendicular to the vertical axis z. Owing to this linear movement, a driving force is exerted, due to the coupling joint 27, on the carrier 3, which is movably supported in the housing 12, in a manner such that said carrier can be moved along and counter to the vertical direction z.

Figure 16:
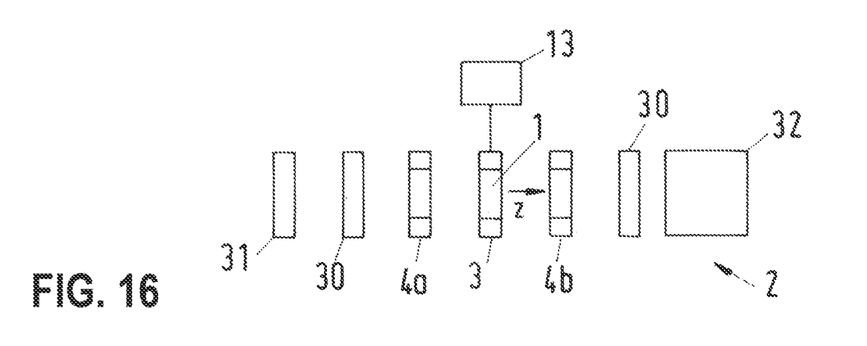
FIG. 16 shows a schematic block diagram of an optical system according to an exemplary embodiment of the disclosure.

FIG. 16 shows a schematic block diagram of an optical system 2 according to the disclosure. It illustrates the carrier 3 with the optical element 1 attached thereto, and end stop elements 4a, 4b. It furthermore illustrates that the optical system 2 can include further optical elements 30, for example optical elements in the form of further lens elements or mirrors. However, these further optical elements 30 can be arranged fixed in space, that is to say immovably. Said figure further illustrates that the optical system 2 includes a terminating glass 31, which closes the beam path of the optical system 2 with respect to an outside environment. It further illustrates an image sensor 32 of an image capture device. Said image sensor 32 can likewise be an integral part of the optical system 2.

LIST OF REFERENCE NUMERALS

1 Optical element
2 Optical system
3 Carrier
4a, 4b End stop element
5 Hollow-cylindrical section
6 Plate-type section
7 Through opening
8a Bearing element
9a First corresponding bearing element
8b Bearing element
9b Further corresponding bearing element
10 Rack section
11 Through opening
12 Housing
13 Drive device
14 Drive output element
15 Coupling element
16 Guiding rod
17 Leaf spring, coupling element
18 Receiving section
19 Further leaf spring
20 Ball bearing
21a, 21b Receiving section
22 Base section
23 Semiannular section
24 Movement bearing element
25 Leaf spring section
26 Ball bearing
27 Coupling joint
28 Electrical line
29 Printed circuit board
30 Further optical elements
31 Terminating glass
32 Image sensor
33 Drive device
34 Carrier structure
35 Carrier plate
L1 First stop pose
L2 Second stop pose
x Longitudinal axis
y Transverse axis
z Vertical axis

What is claimed is:

1. An optical system, comprising: a carrier plate in which at least one optical element is arranged, wherein the carrier plate comprises at least one carrier; a movement bearing element configured to support the carrier plate during a movement; a first end stop element having or forming at least one first bearing element for statically supporting the carrier plate; a further end stop element having or forming at least one further bearing element for statically supporting the carrier plate; and at least one locking element configured to lock the carrier plate in at least one stop pose, wherein the at least one carrier comprises first corresponding bearing elements and further corresponding bearing elements for providing static support, wherein the carrier plate is supported movably between the first and further end stop elements, and wherein the at least one first and the at least one further bearing elements define the at least one stop pose of the carrier plate with repetition accuracy.

2. The optical system as claimed in claim 1, wherein a repetition accuracy of a movement pose of the at least one optical element is lower than a repetition accuracy in the at least one stop pose of the carrier plate, and wherein the repetition accuracy of the movement pose of the optical element defined by the movement bearing element represents an extent of a maximum deviation between actual movement poses that occur for multiple movements of the at least one carrier into a predetermined movement pose.

3. The optical system as claimed in claim 1, wherein the first corresponding bearing elements of the at least one carrier corresponding to the at least one first bearing element are arranged on the at least one carrier of the carrier plate, and wherein the further corresponding bearing elements of the at least one carrier corresponding to the at least one further bearing element are arranged on another of the at least one carrier of the carrier plate.

4. The optical system as claimed in claim 1, wherein the at least one first and/or the at least one further bearing element is/are (an) element(s) of a three-point bearing.

5. The optical system as claimed in claim 4, wherein the at least one coupling element or a further coupling element is formed as a movement-guided coupling element.

6. The optical system as claimed in claim 1, wherein a drive device is mechanically coupled to the at least one carrier via at least one coupling element, and
wherein the at least one coupling element is formed as a spring element.

7. The optical system as claimed in claim 6, wherein the spring element is formed as a leaf spring or comprises at least one leaf spring section.

8. The optical system as claimed in claim 1, wherein the at least one locking element is formed for locking a coupling element.

9. The optical system as claimed in claim 1, wherein the at least one locking element comprises a first leaf spring and a ball bearing.

10. The optical system as claimed in claim 1, further comprising or forming at least one element of an electrical circuit which is closed when the at least one carrier is in one of the stop poses and is open when the at least one carrier is not in one of the stop poses.

11. A method for operating an optical system as claimed in claim 1, the method comprising: moving the carrier plate between the stop poses of the at least one carrier.

12. The method as claim in claim 11, further comprising: after a movement of the carrier plate into one of the stop poses of the at least one carrier, checking whether the carrier plate is in one of the stop poses of the at least one carrier.

13. An optical system, comprising: a carrier plate in which at least one optical element is arranged, wherein the carrier plate comprises at least one carrier; a movement bearing element configured to support the carrier plate during a movement; a first end stop element having or forming at least one first bearing element for statically supporting the carrier plate; a further end stop element having or forming at least one further bearing element for statically supporting the carrier plate; wherein the at least one carrier comprises first corresponding bearing elements and further corresponding bearing elements for providing static support, wherein the carrier plate is supported movably between the first and further end stop elements, and wherein the at least one first and the at least one further bearing elements define the at least one stop pose of the carrier plate with repetition accuracy, wherein a coupling element that is coupled to the at least one carrier is supported movably on the at least one carrier, and wherein a relative movement between the at least one carrier and the coupling element is limited.

14. An optical system, comprising: a carrier plate in which at least one optical element is arranged, wherein the carrier plate comprises at least one carrier; a movement bearing element configured to support the carrier plate during a movement; a first end stop element having or forming at least one first bearing element for statically supporting the carrier plate; a further end stop element having or forming at least one further bearing element for statically supporting the carrier plate; wherein the at least one carrier comprises first corresponding bearing elements and further corresponding bearing elements for providing static support, wherein the carrier plate is supported movably between the first and further end stop elements, and wherein the at least one first and the at least one further bearing elements define the at least one stop pose of the carrier plate with repetition accuracy, wherein a drive device is mechanically coupled to the at least one carrier via at least one coupling element, wherein the at least one coupling element is formed as a spring element, wherein the spring element is formed as a leaf spring or comprises at least one leaf spring section, wherein the at least one carrier has or forms at least one receiving section for receiving the leaf spring, and wherein a dimension of the at least one receiving section changes along its centerline.

* * * * *

UNITED STATES PATENT AND TRADEMARK OFFICE
CERTIFICATE OF CORRECTION

Page 1 of 1

PATENT NO. : 12,339,517 B2
APPLICATION NO. : 17/739119
DATED : June 24, 2025
INVENTOR(S) : Natalie Krieg and Andre Mueller It is certified that error appears in the above-identified patent and that said Letters Patent is hereby corrected as shown below:

In the Claims

Claim 12:
Column 18, Line 44: Replace "The method as claim in claim 11" with "The method as claimed in claim 11"

Signed and Sealed this
Thirtieth Day of September, 2025

John A. Squires
*Director of the United States Patent and Trademark Office*